March 10, 1970　　TAMOTSU UENO ET AL　　3,499,946

METHOD FOR SEPARATING m- AND p-XYLENE FROM A MIXTURE OF XYLENES

Filed Aug. 15, 1967

INVENTORS
Tamotsu Ueno
Takashi Nakano
Kazuo Okamoto

BY Cushman, Darby & Cushman
ATTORNEYS 3,499,946
METHOD FOR SEPARATING m- AND p-XYLENE FROM A MIXTURE OF XYLENES
Tamotsu Ueno, Takashi Nakano, and Kazuo Okamoto, Niigata-shi, Japan, assignors to Japan Gas-Chemical Company, Inc., Chiyoda-ku, Tokyo, Japan
Filed Aug. 15, 1967, Ser. No. 660,805
Claims priority, application Japan, Sept. 1, 1966, 41/57,774
Int. Cl. C07c 7/10, 7/14
U.S. Cl. 260—674            24 Claims

ABSTRACT OF THE DISCLOSURE

A process for the separation of m-xylene and p-xylene individually from a xylene mixture containing ethylbenzene, o-xylene, m-xylene and p-xylene, said process being characterized by adding to the xylene mixture hydrogen fluoride, boron fluoride and a eutectic crystal-forming compound with p-xylene while maintaining said mixture at a temperature ranging from 0 to $-60°$ C., whereby said mixture is separated into three phases consisting of a solid phase of eutectic crystal consisting of p-xylene and the eutectic crystal-forming compound, a liquid phase of extract containing hydrogen fluoride, boron fluoride and m-xylene, and a liquid phase of hydrocarbon containing xylene raffinate and the eutectic crystal-forming compound, by virtue of specific gravity difference.

---

The present invention relates to a process by which m-xylene and p-xylene are separated individually from a xylene mixture simultaneously in a single step, and particularly the present invention relates to a process by which m-xylene and p-xylene are separated individually from a xylene mixture simultaneously by a single apparatus in an efficient manner. More particularly, the present invention relates to a process by which p-xylene is separated at a temperature about 20° C. higher than that at which the conventional low temperature crystallization process is operated, by adding to said xylene mixture hydrogen fluoride, boron fluoride and eutectic crystal-forming compound.

In a xylene mixture containing ethylbenzene, o-xylene, m-xylene and p-xylene, the xylene isomers composing the mixture respectively have boiling points which are very close to each other. Particularly, the boiling point of m-xylene is extremely close to that of p-xylene, the difference being only 0.75° C. For this reason, it is of extreme difficulty to separate from such xylene mixture the respective xylene isomers, particularly m-xylene and p-xylene, individually by distillation at high purity.

An object of the present invention, therefore, is to provide a process by which m-xylene and p-xylene can be separated individually from a xylene mixture in a simple and efficient manner.

Another object of the present invention is to provide a process by which p-xylene can be separated from a xylene mixture at a temperature higher than that at which the conventional low temperature crystallization process is operated.

Still another object of the present invention is to provide a process by which m-xylene and p-xylene can be separated individually in a single step.

According to the present invention, there is provided a process for the separation of m-xylene and p-xylene from a xylene mixture, which comprises adding to the xylene mixture hydrogen fluoride and boron fluoride to separate m-xylene from said mixture by extracting it with hydrogen fluoride and concurrently adding to said mixture a compound such, for example, as carbon tetrachloride, carbon tetrabromide, bromoform, dibromo- dichloromethane, antimony tribromide or antimony trichloride, which is capable of forming with p-xylene a eutectic crystal having a specific gravity of the order of 1.2 to 3.0, to thereby separate the p-xylene in the form of a eutectic crystal with said compound.

When hydrogen fluoride is admixed with a xylene mixture and boron fluoride is blown into the resultant mixture to be absorbed therein, the xylene isomers form complexes respectively, from the one having the highest basicity first, which are selectively dissolved in the hydrogen fluoride. Of four xylene isomers, i.e. m-xylene, o-xylene, p-xylene and ethylbenzene, composing the xylene mixture, m-xylene has an extremely high basicity as compared with the rest of isomers. Thus, when a xylene mixture containing m-xylene is treated with hydrogen fluoride and boron fluoride, m-xylene is first dissolved in the phase of hydrogen fluoride and xylene phase containing a small amount of m-xylene remains as a raffinate. In this case, the specific gravity of the hydrogen fluoride phase, according to the measurements by the present inventors, is variable depending upon the amount of boron fluoride used and the temperature, but is within the range from 1.05 to 1.23 at a temperature of 0 to $-60°$ C. within the scope of the present invention.

A eutectic crystal of p-xylene has a specific gravity which is far greater than that of crystalline p-xylene, as shown in Table 1, below, and which is generally in the range from 1.2 to 3.0, though variable depending upon the type of eutectic crystal.

TABLE 1

| | Specific gravity |
|---|---|
| p-Xylene | 1.04 |
| p-Xylene-$CCl_4$ | 1.37 |
| p-Xylene-$CBr_4$ | 2.35 |

The combination ratio between p-xylene and a eutectic crystal-forming compound, in the case of antimony halide, is as follows:

$SbCl_3$:p-xylene=1:1 (melting point=56° C.)
$SbCl_3$:p-xylene=2:1 (melting point=60° C.)
$SbBr_3$:p-xylene=2:1 (melting point=67.5° C.)

Compounds, such as carbon tetrachloride and carbon tetrabromide, form a homogeneous phase with xylenes and the specific gravities of such mixtures may be varied optionally within the range from 0.87 to 1.03, by controlling the mol fraction of the eutectic crystal-forming compound in the raffinate to be 0.25 or smaller.

As will be understood from the foregoing, when the operation of extracting m-xylene from a xylene mixture, using hydrogen fluoride and boron fluoride, with the hydrogen fluoride phase, and the operation of separating p-xylene from the xylene mixture in the form of a eutectic crystal thereof, using such a eutectic crystal-forming compound as carbon tetrachloride or carbon tetrabromide, are carried out in one vessel, the entire system is readily separated into three phases consisting, from the bottom, of a solid phase of eutectic crystal consisting of p-xylene and the eutectic crystal-forming compound, a liquid phase of extract containing hydrogen fluoride, boron fluoride and m-xylene, and a liquid phase of hydrocarbon containing xylene raffinate and the eutectic crystal-forming compound, by virtue of specific gravity difference. That is to say that, when a eutectic crystal-forming compound and hydrogen fluoride are added to a xylene mixture and then boron fluoride is added with stirring while maintaining the temperature of the system at a predetermined level, xylenes consisting primarily of m-xylene form a complex with hydrogen fluoride and boron fluoride, and said complex is dissolved into the hydrogen fluoride phase. Thus, the m-xylene concentration in the xylene phase decreases, with the consequent relative concentration of the isomers other than m-xylene. Such concentration of isomers is particularly remarkable due to the fact that xylene mixture usually contains m-xylene in an amount about half of said mixture. As a result, a eutectic crystal between p-xylene and the eutectic crystal-forming compound begins to precipitate, as the p-xylene concentration increases, and comes out of the system forming a solid phase. Since the eutectic crystal has a large specific gravity, it settles down to form a bottom layer, when the system is held still. Above the eutectic crystal layer is formed an intermediate layer consisting of a hydrogen fluoride extract, which is further superposed by a top layer consisting of a raffinate. In this case, the eutectic crystal drops through the hydrogen fluoride phase and is massed below said hydrogen fluoride phase, with the mother liquor retained therein, but the mother liquor consisting of xylene raffinate and eutectic crystal-forming compound, may be made to ascend through the hydrogen fluoride phase to be combined with the raffinate, as it is possible to make the specific gravity of said mother liquor smaller than that of the hydrogen fluoride phase by properly selecting the composition of the raffinate and temperature. In other words, the hydrogen fluoride phase acts as a medium through which the mother liquor is squeezed from the eutectic crystal.

The process of the present invention is preferably carried out at a temperature of 0 to $-60°$ C. and most preferably from $-10$ to $-40°$ C. Hydrogen fluoride is used preferably in an amount of 5 to 20 mols per mol of m-xylene present in a xylene mixture, whereas boron fluoride is added preferably in an amount of 0.5 to 2.0 mols per mol of m-xylene present in the xylene mixture and a eutectic crystal-forming compound is used preferably in an amount of 0.5 to 1.5 mols per mol of p-xylene present in the xylene mixture.

By practicing the process of this invention, it is possible not only to separate m-xylene and p-xylene from a xylene mixture individually simultaneously by a single apparatus, but also to improve the selectivity in the extraction operation. Speaking more specifically, in comparison of a system in which the aforementioned three phases are coexisting in an equilibrium state, as in the present invention, with a system which comprises two liquid phases merely engaging in the extraction operation, the former has the advantage that the p-xylene concentration in the raffinate (mother liquor) can be controlled to a value which is far smaller than that in the latter, because the p-xylene concentration in the former may be regulated by virtue of solid-liquid equilibrium or solubility at a given temperature. Consequently, only a small amount of p-xylene is contained in the hydrogen fluoride extract.

According to the present invention, it is possible to separate p-xylene from a xylene mixture at a temperature about 20° C. higher than that at which the conventional low temperature crystallization process is operated but yet in the same amount, concentration and yield as those obtainable by the latter. This is because p-xylene in the raffinate is concentrated as a result of extraction of m-xylene. Thus, the present invention is of great improvement over the conventional method of separating p-xylene according to the low temperature crystallization process.

Another advantage of the present invention is that it is possible to obtain a eutectic crystal of p-xylene in a considerably high purity, without need for producing a concentration gradient in the crystal layer, owing to the effect of the hydrogen fluoride extraction phase acting as a medium. According to the conventional low temperature crystallization process, p-xylene crystal of a purity of about 80% is obtained in the first step of filtering using a centrifugal separator. However, according to the present invention, p-xylene eutectic crystal 80% (pure based on xylene) is obtainable, even wtihout using a centrifugal separator, by virtue of the effect of hydrogen fluoride phase acting as a medium.

As has been described hereinabove, the process of this invention enables m-xylene and p-xylene to be separated individually all at once in a single step. Ethylbenzene or o-xylene can be separated from the mixture remaining after the removing of m-xylene and p-xylene easily by the common distillation process.

Now, the process of the present invention will be described with reference to the accompanying drawings in which several different modes of practicing the process of this invention are illustrated.

According to one mode of practice, the process of this invention is operated by batch system. In this mode, the process comprises, as described previously, adding to a xylene mixture hydrogen fluoride and a eutectic crystal-forming compound in a single vessel, then adding to the resultant mixture boron fluoride with stirring while maintaining said mixture at a predetermined temperature, drawing the crystal phase formed from the bottom end of the vessel upon melting the same and thereafter drawing the hydrogen fluoride phase and raffinate out of the vessel successively. The p-xylene eutectic crystal formed can be separated into p-xylene and the eutectic crystal-forming compound easily by distillation after melting. On the other hand, the hydrogen fluoride extract can be decomposed into hydrogen fluoride, boron fluoride and m-xylene easily by means of heat decomposition.

Figure 1:
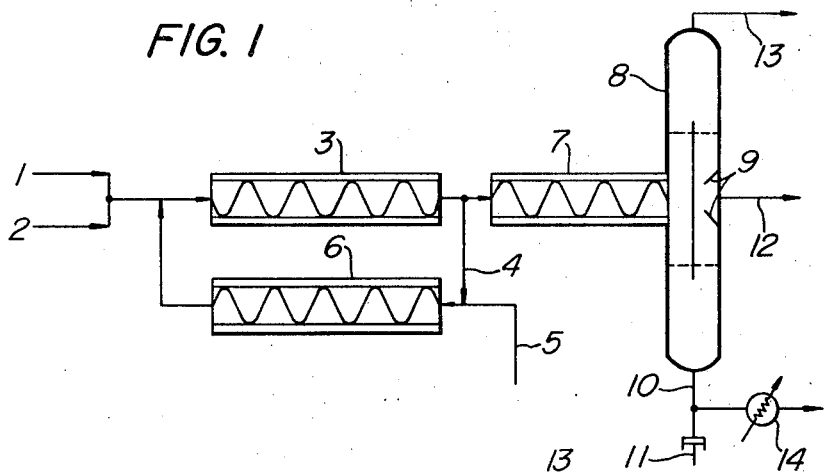
FIG. 1 is a diagrammatic view of one form of the apparatus for practicing the process of this invention.

According to another mode, the process of the invention is operated continuously in a simple apparatus as shown in FIG. 1. In describing this mode of process with reference to FIG. 1, a material xylene mixture and a eutectic crystal-forming compound are supplied through a feed tube 1 and hydrogen fluoride is supplied through a feed tube 2, into a scraped surface chiller 3. Part of the effluent from the chiller 3 is drawn through a branch tube 4 and led into another scraped surface chiller 6, together with boron fluoride supplied through a tube 5. The chiller 3 is provided for the purpose of forming a eutectic crystal therein, while the chiller 6 is provided primarily for the purpose of absorbing the heat generated during formation of a complex. The mixture of slurry and hydrogen fluoride extract, thus obtained, is led through a chiller 7 into a separator 8. The separator 8 is provided at suitable locations interior thereof with baffles 9 so as to facilitate dropping of crystal masses, ascending of the mother liquor and drawing of hydrogen fluoride phase, and the exterior thereof is surrounded by a jacket. Inside of the separator are formed, from the top, a raffinate (mother liquor) phase, a hydrogen fluoride extract phase and a eutectic crystal phase with crystal masses moving downwardly and the mother liquor moving upwardly continuously through said hydrogen fluoride phase. In order to enable the crystal phase to move within the separator smoothly, a pulse pump 11 is provided on a discharge tube 10 connected to the bottom end of the separator. The eutectic crystal is discharged through the discharge tube 10, hydrogen fluoride extract is discharged through a tube 12 connected to the side of the separator and the raffinate is discharged through a tube 13 connected to the top end of the separator, in a manner such that the levels of the respective phases are maintained constant. The eutectic crystal drawn through the tube 10 is melted by a heater 14, provided at an intermediate point of said tube, and thus is taken out in a state of liquid.

Figure 2:
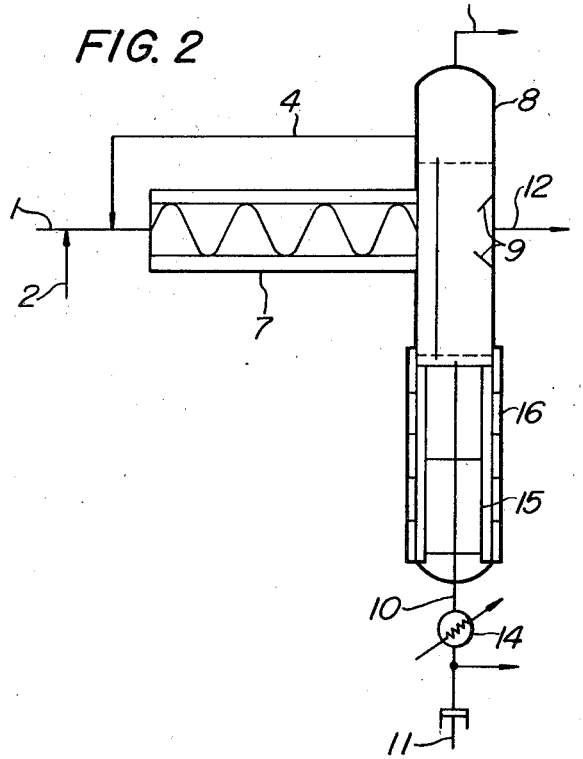
FIG. 2 is a diagrammatic view of another form of the apparatus for practicing the process of this invention.

According to still another mode of practice, the process of the invention is carried out by an apparatus as shown in FIG. 2, in which a molten solution of eutectic crystal is refluxed through a separator upwardly from the bottom of a eutectic crystal phase by spontaneous circulation so as to produce a temperature gradient as well as a concentration gradient in the eutectic crystal phase, whereby a pure p-xylene eutectic crystal is drawn from the bottom end of the separator. In describing the apparatus in more detail with reference to FIG. 2, a material xylene mixture supplied through a tube 1, a hydrogen fluoride extract supplied through a tube 2 and a raffinate supplied through a tube 4, are introduced into a separator 8 through a scraped surface chiller 7. The configuration and the central portion of the separator are substantially the same as those shown in FIG. 1, but at the lower portion of the separator is provided a scraper 15 for producing a temperature gradient in the crystal phase as well as for enabling said crystal phase to move axially uniformly. The exterior of the lower portion of the separator is surrounded by a jacket 16 to ease development of the temperature gradient. A heater 14 is provided at the bottom of the separator. It will thus be understood that the eutectic crystal is melted and flows upwardly through the separator as being a mother liquor while going through the repeated steps of melting and recrystallization with the eutectic crystal on the respective levels. In other words, a condition is produced within the separator under which the mother liquor is refluxed therein, and the resulting temperature gradient developed in the column is to be consistent to the concentration gradient of mother liquor. The temperature gradient in the mother liquor may be made consistent with the concentration gradient in the same by adjusting the heat input from the heater (amount of the mother liquor being refluxed), drawing out rate of the crystal phase and the crystal feed rate, in such a manner as to attain solid-liquid equilibrium. The amount of heat supplied by the heater 14 is offset by the corresponding amount of heat removed by recirculation and cooling of the mother liquor at the top end of the separator as well as by precipitation of crystal. The recirculation of the mother liquor is effected through the tube 4.

Figure 3:
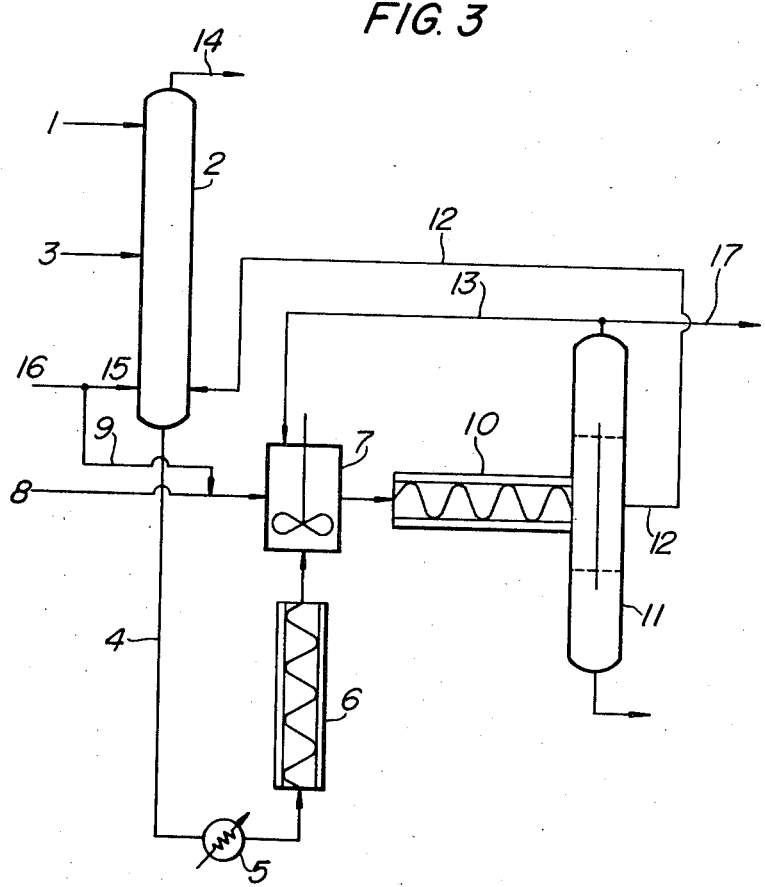
FIG. 3 is a diagrammatic view of still another form of the apparatus for practicing the process of the invention.

According to still another mode of practicing the process of this invention, continuous counter current extraction of m-xylene with hydrogen fluoride and boron fluoride, and separation of p-xylene by way of eutectic crystal are combined, using an apparatus as shown in FIG. 3. Referring to FIG. 3, a mixture of a eutectic crystal-forming compound and refluxed m-xylene is introduced into a xylene extractor 2 through a tube 1, wherein said mixture flows downwardly while contacting hydrogen fluoride extract. A material xylene mixture is fed into the extractor 2 through a tube 3 and the raffinate obtained from the bottom end of the extractor is led into a scraped surface chiller 6 through a tube 4 and a precooler 5, whereby a p-xylene eutectic crystal is precipitated. The slurry thus formed is led into a mixing chamber 7, wherein it is formed into a complex with hydrogen fluoride, fed through a tube 8, and boron fluoride, fed through tubes 16 and 9. The mixture of the slurry and the hydrogen fluoride extract is further led into a separator 11 through a scraped surface chiller 10. The p-xylene eutectic crystal is down from the bottom of the separator 11, while the raffinate is drawn from the top end of the same. The hydrogen fluoride extract discharged from the central portion of the separator 11 flows through a tube 12 and recirculated to the bottom of the xylene extractor 2 and, after passing through said extractor upwardly, is discharged through a tube 14. Part of the raffinate, discharged from the top end of the separator 11, is returned to the mixing chamber 7 through a tube 13, whereas the remaining part thereof is drawn out through a tube 17. It will also be noted that part of the boron fluoride, supplied into the mixing chamber, is led into the xylene extractor 2 through a tube 15.

Next, the process of the present invention will be illustrated by way of example.

Example 1

28.8 g. carbon tetrachloride, 100 g. xylene mixture and 100 g. hydrogen fluoride were charged in a Kel F-made 400 cc. vessel equipped with a cooling jacket and a combination scraper and stirrer, and 31 g. boron fluoride was blown into the mixture with stirring while maintaining the temperature at $-45°$ C. Thereafter, the mixture was left to stand still, whereby the mixture was separated into three phases consisting, from the bottom, of a crystal phase, an extract phase and a raffinate (mother liquor) phase. The temperature of the system was elevated slowly to $-42°$ C. over a period of about 10 minutes with mild stirring and thereafter the crystal phase, extract phase and raffinate phase were drawn from the bottom of the vessel in the order mentioned. The results of the analysis conducted on the respective phases are shown in Table 2 below.

TABLE 2

| | Material | | Crystal phase | | Raffinate | | HF extract | |
| --- | --- | --- | --- | --- | --- | --- | --- | --- |
| | Wt. percent | Wt., g. | Wt. percent | Wt., g. | Wt. percent | Wt., g. | Wt. percent | Wt., g. |
| Ethylbenzene | 10.5 | 10.5 | 7.1 | 1.2 | 34.9 | 8.1 | 2.0 | 1.2 |
| o-Xylene | 19.6 | 19.6 | 8.8 | 1.5 | 36.6 | 8.5 | 16.1 | 9.6 |
| m-Xylene | 48.7 | 48.7 | 1.8 | 0.3 | 9.5 | 2.2 | 77.2 | 46.2 |
| p-Xylene | 21.2 | 21.2 | 82.3 | 14.0 | 19.0 | 4.4 | 4.7 | 2.8 |
| Total | 100 | 100 | 100 | 17.0 | 100 | 23.2 | 100 | 59.8 |
| Carbon tetrachloride | | | | | 20.5 | | 8.3 | |
| Total | | | | | 37.5 | | 31.5 | |
| Specific gravity | | | 1.32 | | 1.00 | | 1.15 | |

Example 2

In the same vessel as used in Example 1 were charged 48.5 g. carbon tetrabromide, 100 g. xylene mixture and 50 g. hydrogen fluoride, and then 17 g. boron fluoride was blown into the mixture while maintaining the temperature at $-35°$ C. The results of analysis conducted on the three phases obtained are shown in Table 3 below.

TABLE 3

| | Material | | Crystal phase | | Raffinate | | HF extract | |
| --- | --- | --- | --- | --- | --- | --- | --- | --- |
| | Wt. percent | Wt., g. | Wt. percent | Wt., g. | Wt. percent | Wt., g. | Wt. percent | Wt., g. |
| Ethylbenzene | 21.7 | 21.7 | 7.5 | 1.0 | 54.5 | 18.8 | 3.6 | 1.9 |
| o-Xylene | 17.5 | 17.5 | 6.0 | 0.8 | 21.2 | 7.3 | 18.0 | 9.4 |
| m-Xylene | 41.3 | 41.3 | 1.5 | 0.2 | 8.7 | 3.0 | 73.0 | 38.1 |
| p-Xylene | 19.5 | 19.5 | 85.0 | 11.3 | 15.6 | 5.4 | 5.4 | 2.8 |
| Total | 100 | 100 | 100 | 13.3 | 100 | 34.5 | 100 | 52.2 |
| Carbon tetrabromide | | | | | 41.5 | | 7.0 | |
| Total | | | | | 54.8 | | 41.5 | |
| Specific gravity | | | 2.05 | | 1.01 | | 1.12 | |

Reference Example 1.—As a control, a separation operation was carried out by the conventional low temperature crystallization process at −70° C., the result of which is shown in Table 4 below.

TABLE 4

|  | Material | | Crystal | | Mother liquor | |
| --- | --- | --- | --- | --- | --- | --- |
|  | Wt. percent | Wt., g. | Wt. percent | Wt., g. | Wt. percent | Wt., g. |
| Ethylbenzene | 10.5 | 10.5 | 2.3 | 0.4 | 12.2 | 10.1 |
| o-Xylene | 19.6 | 19.6 | 4.1 | 0.7 | 22.8 | 18.9 |
| m-Xylene | 48.7 | 48.7 | 12.2 | 2.1 | 56.3 | 46.6 |
| p-Xylene | 21.2 | 21.2 | 81.4 | 14.0 | 8.7 | 7.2 |
| Total | 100 | 100 | 100 | 17.2 | 100 | 82.8 |

Reference Example 2.—As a control, m-xylene only was extracted at a temperature of 0° C. using hydrogen fluoride and boron fluoride, the result of which is shown in Table 5 below. The amount of hydrogen fluoride used was 100 g., while the amount of boron fluoride blown in was 31 g.

TABLE 5

|  | Material | | Raffinate | | HF extract | |
| --- | --- | --- | --- | --- | --- | --- |
|  | Wt. percent | Wt., g. | Wt. percent | Wt., g. | Wt. percent | Wt., g. |
| Ethylbenzene | 10.5 | 10.5 | 26.2 | 7.7 | 4.0 | 2.8 |
| o-Xylene | 19.6 | 19.6 | 20.4 | 6.0 | 19.3 | 13.6 |
| m-Xylene | 48.7 | 48.7 | 11.9 | 3.5 | 64.0 | 45.2 |
| p-Xylene | 21.2 | 21.2 | 41.5 | 12.2 | 12.7 | 9.0 |
| Total | 100 | 100 | 100 | 29.4 | 100 | 70.6 |

We claim:

1. A process for simultaneously separating m-xylene and p-xylene from a xylene mixture, comprising adding an extracting reagent consisting essentially of hydrogen fluoride and boron fluoride to the xylene mixture to extract the m-xylene into the hydrogen fluoride phase as a complex of hydrogen fluoride, boron fluoride and m-xylene, and adding a compound capable of forming a eutectic crystal with p-xylene to the xylene mixture to separate p-xylene as the eutectic crystal.

2. A process for the separation of m-xylene and p-xylene individually from a xylene mixture according to claim 1, in which the specific gravity of the hydrogen fluoride extract phase is in the range from 1.05 to 1.23 and the specific gravity of the mixture phase consisting of the raffinate and the eutectic crystal-forming compound is in the range from 0.87 to 1.03.

3. A process for the sepaartion of m-xylene and p-xylene individually from a xylene mixture according to claim 1, in which said eutectic crystal-forming compound is carbon tetrachloride, carbon tetrabromide, bromoform, dibromodichloromethane, antimony tribromide or antimony trichloride.

4. A process for the separation of m-xylene and p-xylene individually from a xylene mixture according to claim 1, in which hydrogen fluoride is used in an amount of 5 to 20 mols and boron fluoride is used in an amount of 0.5 to 2.0 mols, per mol of m-xylene in the xylene mixture, and said eutectic crystal-forming compound is used in an amount of 0.5 to 1.5 mols per mol of p-xylene in the xylene mixture.

5. A process for the separation of m-xylene and p-xylene individually from a xylene mixture according to claim 1 in which said process is operated at a temperature of 0 to −60° C.

6. A process for simultaneously separating m-xylene and p-xylene from a xylene mixture, comprising adding hydrogen fluoride and a eutectic crystal-forming compound to the xylene mixture in the same and one vessel, adding boron fluoride to the resultant mixture with stirring while maintaining said mixture at 0 to 60° C., melting and drawing the crystal phase formed from the bottom of the vessel, and then drawing the hydrogen fluoride phase and the raffinate phase in that order.

7. A process for separating m-xylene and p-xylene from a xylene mixture according to claim 6, in which the specific gravity of the hydrogen fluoride extract phase is in the range from 1.05 to 1.23 and the specific gravity of the mixture phase consisting of the raffinate and the eutectic crystal-forming compound is in the range from 0.87 to 1.03.

8. A process for separating m-xylene and p-xylene from a xylene mixture according to claim 6, in which said eutetic crystal-forming compound is carbon tetrachloride, carbon tetrabromide, bromoform, dibromodichloromethane, antimony tribromide or antimony trichloride.

9. A process for separating m-xylene and p-xylene from a xylene mixture according to claim 6, in which hydrogen fluoride is used in an amount of 5 to 20 mols and boron fluoride is used in an amount of 0.5 to 2.0 mols, per mol of m-xylene in the xylene mixture, and said eutectic crystal forming compound is used in an amount of 0.5 to 1.5 mols per mol of p-xylene in the xylene mixture.

10. A process for the separation of m-xylene and p-xylene individually from a xylene mixture, comprising introducing the xylene mixture, a eutectic crystal-forming compound and hydrogen fluoride simultaneously into a first scraped surface chiller to form a eutectic crystal; introducing part of the effluent from said first chiller into a second scraped surface chiller along with boron fluoride to remove the heat generated during formation of the complex; recirculating the mixture of the cooled boron fluoride containing the complex and said part of effluent to said first chiller; leading the mixture of the precipitated eutectic crystal and hydrogen fluoride extract containing slurry, leaving said first condenser, through a third scraped surface chiller into a separator having the exterior thereof surrounded by a jacket, wherein the crystal masses moves downwardly and the mother liquor flows upwardly continuously; and drawing the eutectic crystal from the bottom, the hydrogen fluoride extract from the mid portion and the raffinate from the top, of said separator, while maintaining the levels of the eutectic crystal between p-xylene and the eutectic crystal-forming compound, the m-xylene-containing hydrogen fluoride extract and the raffinate constant in said separator.

11. A process for the separation of m-xylene and p-xylene individually from a xylene mixture according to claim 10, in which the specific gravity of the hydrogen fluoride extract phase is in the range from 1.05 to 1.23 and the specific gravity of the mixture phase consisting of the raffinate and the eutectic crystal-forming compound is in the range from 0.87 to 1.03.

12. A process for the separation of m-xylene and p-xylene individually from a xylene mixture according to claim 10, in which said eutectic crystal-forming compound is carbon tetrachloride, carbon tetrabromide, bromoform, dibromodichloromethane, antimony tribromide or antimony trichloride.

13. A process for the separation of m-xylene and p-xylene individually from a xylene mixture according to claim 10, in which hydrogen fluoride is used in an amount of 5 to 20 mols and boron fluoride is used in an amount of 0.5 to 2.0 mols, per mol of m-xylene in the xylene mixture, and said eutectic crystal-forming compound is used in an amount of 0.5 to 1.5 mols per mol of p-xylene in the xylene mixture.

14. A process for the separation of m-xylene and p-xylene individually from a xylene mixture according to claim 10, in which the interior of said first, second and third chillers and said separator is maintained at a temperature of 0 to −60° C.

15. A process for the separation of m-xylene and p-xylene individually from a xylene mixture, comprising introducing the xylene mixture and a mixture of hydrogen fluoride and boron fluoride into a separator along with the below-mentioned raffinate through a scraped surface chiller, said separator being provided at the lower portion thereof with a scraper to produce a temperature gradient in a eutectic crystal phase consisting of a eutectic crystal between p-xylene and a eutectic crystal-forming compound as well as to cause a uniform movement of the eutectic crystal axially of the separator, and having the exterior thereof surrounded by a jacket; heating the eutectic crystal phase in the lower portion of said separator to thereby cause the molten eutectic crystal to flow upwardly within said tower, as being a mother liquor, while going through the repeated steps of melting and recrystallization with the eutectic crystal present in the tower and thereby developing a purity gradient in the xylene mother liquor within the crystal from the upper portion to the lower portion thereof; drawing the p-xylene eutectic crystal from the bottom end, the m-xylene-containing hydrogen fluoride from the mid portion and the raffinate from the top end, of the separator; and recirculating part of said raffinate into the mixture of the xylene mixture and the hydrogen fluoride extract.

16. A process for the separation of m-xylene and p-xylene individually from a xylene mixture according to claim 15, in which the specific gravity of the hydrogen fluoride extract phase is in the range from 1.05 to 1.23 and the specific gravity of the mixture phase consisting of the raffinate and the eutectic crystal-forming compound is in the range from 0.87 to 1.03.

17. A process for the separation of m-xylene and p-xylene individually from a xylene mixture according to claim 15, in which said eutectic crystal-forming compound is carbon tetrachloride, carbon tetrabromide, bromoform, dibromodichloromethane, antimony tribromide or antimony trichloride.

18. A process for the separation of m-xylene and p-xylene individually from a xylene mixture according to claim 15, in which hydrogen fluoride is used in an amount of 5 to 20 mols and boron fluoride is used in an amount of 0.5 to 2.0 mols, per mol of m-xylene in the xylene mixture, and said eutectic crystal-forming compound is used in an amount of 0.5 to 1.5 mols per mol of p-xylene in the xylene mixture.

19. A process for the separation of m-xylene and p-xylene individually from a xylene mixture according to claim 15, in which the interior of said chillers is maintained within the temperature range from 0 to −60° C.

20. A process for the separation of m-xylene and p-xylene individually from a xylene mixture, comprising introducing into an extractor a mixture of a eutectic crystal-forming compound and recirculated m-xylene from the top end thereof, the xylene mixture from the mid portion thereof to flow downwardly, and boron fluoride and hydrogen fluoride from the bottom end thereof to flow upwardly, said mixture of eutectic crystal-forming compound and recirculated m-xylene flowing downwardly of the extractor in contact with the counter current of said hydrogen fluoride and boron fluoride; drawing the raffinate from the bottom end of said extractor to pass it through a precooler and then through a first scraped surface chiller thereby precipitating a eutectic crystal of p-xylene; introducing the eutectic crystal-containing slurry into a mixing chamber to which hydrogen fluoride and boron fluoride are being fed; introducing the mixture of the slurry, formed in said mixing chamber, and the hydrogen fluoride extract, into a separator through a second scraped surface chiller, said slurry containing a complex of m-xylene with boron fluoride and hydrogen fluoride, and the eutectic crystal; drawing the eutectic crystal from the bottom end and the hydrogen fluoride extract from the mid portion of said separator, said hydrogen fluoride extract being recirculated to said xylene extractor from the bottom end thereof to flow through said extractor and to be discharged from the top end thereof; drawing the raffinate from the top end of said separator; and recirculating part of said raffinate to said mixing chamber.

21. A process for the separation of m-xylene and p-xylene individually from a xylene mixture according to claim 20, in which the specific gravity of the hydrogen fluoride extract phase is in the range from 1.05 to 1.23 and the specific gravity of the mixture phase consisting of the raffinate and the eutectic crystal-forming compound is in the range from 0.87 to 1.03.

22. A process for the separation of m-xylene and p-xylene individually from a xylene mixture according to claim 20, in which said eutectic crystal-forming compound is carbon tetrachloride, carbon tetrabromide, bromoform, dibromodichloromethane, antimony tribromide or antimony trichloride.

23. A process for the separation of m-xylene and p-xylene individually from a xylene mixture according to claim 20, in which hydrogen fluoride is used in an amount of 5 to 20 mols and boron fluoride is used in an amount of 0.5 to 2.0 mols, per mol of m-xylene in the xylene mixture, and said eutectic crystal-forming compound is used in an amount of 0.5 to 1.5 mols per mol of p-xylene in the xylene mixture.

24. A process for the separation of m-xylene and p-xylene individually from a xylene mixture according to claim 20, in which the interior of said first and second chillers, said mixing chamber and said separator is maintained in the temperature range from 0 to −60° C.

References Cited

UNITED STATES PATENTS

| | | | |
|---|---|---|---|
| 2,768,220 | 10/1956 | Nixon et al. | 260—674 |
| 2,780,659 | 2/1957 | McCaulay et al. | 260—674 XR |
| 2,835,714 | 5/1958 | Nixon et al. | 260—674 |
| 2,848,518 | 8/1958 | Fragen | 260—674 |

DELBERT E. GANTZ, Primary Examiner

C. R. DAVIS, Assistant Examiner